United States Patent [19]

Baker

[11] Patent Number: 5,376,170
[45] Date of Patent: Dec. 27, 1994

[54] ADDITIVE DISPERSIONS CONTAINING ETHOXYLATED ALCOHOLS

[75] Inventor: Timothy J. Baker, Claremore, Okla.

[73] Assignee: Petrolite Corporation, St. Louis, Mo.

[21] Appl. No.: 145,482

[22] Filed: Oct. 29, 1993

Related U.S. Application Data

[60] Continuation-in-part of Ser. No. 821,354, Jan. 15, 1992, abandoned, which is a continuation-in-part of Ser. No. 690,748, Apr. 24, 1991, abandoned, which is a continuation-in-part of Ser. No. 616,475, Nov. 21, 1990, Pat. No. 5,035,946, which is a division of Ser. No. 442,890, Nov. 28, 1989, Pat. No. 5,008,144, which is a continuation-in-part of Ser. No. 267,064, Nov. 4, 1988, Pat. No. 4,908,063.

[51] Int. Cl.$^5$ ............................................. C08L 11/06
[52] U.S. Cl. .................... 106/271; 106/270; 524/276
[58] Field of Search .................. 106/270, 271; 524/276

[56] References Cited

U.S. PATENT DOCUMENTS

| | | | |
|---|---|---|---|
| 2,928,752 | 3/1960 | Felletschin | 106/268 |
| 3,249,448 | 5/1966 | Coburn et al. | 106/31 R |
| 3,441,628 | 4/1969 | Ratzsch | 106/31 R |
| 3,950,290 | 7/1991 | Drury, Jr. et al. | 427/258 |
| 3,953,625 | 4/1976 | Quaintance et al. | 427/258 |
| 4,246,150 | 1/1981 | Bower | 106/270 |
| 4,459,388 | 7/1984 | Hettche et al. | 106/270 |
| 4,533,486 | 8/1985 | Scardera et al. | 252/156 |
| 4,740,495 | 4/1988 | Marinelli et al. | 106/31 R |
| 4,827,028 | 5/1989 | Scardera et al. | 252/174.19 |
| 4,865,908 | 9/1989 | Liu et al. | 428/513 |
| 4,908,063 | 3/1990 | Baker et al. | 106/31 R |
| 5,008,144 | 4/1991 | Baker et al. | 106/31 R |
| 5,035,946 | 7/1991 | Baker et al. | 106/31 R |

FOREIGN PATENT DOCUMENTS

| | | |
|---|---|---|
| 0059461 | 9/1982 | European Pat. Off. |
| 0310194 | 4/1989 | European Pat. Off. |
| 2411832 | 3/1974 | Germany |
| 1305211 | 1/1973 | United Kingdom |
| 2025987 | 5/1978 | United Kingdom |
| 899612 | 1/1982 | U.S.S.R. |

OTHER PUBLICATIONS

"Unithox TM Ethoxylates: New Solutions for the Puzzles In Your Water-Based System", 1986, no month.
"Laboratory Preparation of a Dispersion of UNITHOX TM Ethoxylated Alcohols in Water", 1986, no month.
"Potential End Use Application for UNITHOX TM Ethoxylated Alcohols", 1986, no month.
"UNILIN Alcohols: The Use of UNILIN Alcohol in the Formation Of Ethoxylates & Their Properties", 1985, no month.
"UNILIN Alcohols: What are the UNILIN Alcohols?", 1990, no month.

Primary Examiner—Helene Klemanski
Attorney, Agent, or Firm—Pravel, Hewitt, Kimball & Krieger

[57] ABSTRACT

An aqueous dispersion is provided which comprises water, a dispersant and a linear or branched chain saturated aliphatic hydrocarbon. The dispersant is of the general formula $$CH_3(\overset{R}{\underset{|}{C}}H\overset{R_1}{\underset{|}{C}}H)_{\overline{x}}CH_2O(CH_2\overset{R_2}{\underset{|}{C}}HO)_yH$$

wherein R and $R_1$ are independently selected from the group consisting of hydrogen and $C_1$-$C_{10}$ alkyl; $R_2$ is selected from the group consisting of hydrogen and a $C_1$-$C_5$ alkyl group; x is about 8 to about 112 and y is about 1 to about 1,370. The aliphatic hydrocarbon is either linear or branched chain and has a molecular weight of from about 300 to about 5,000. Such dispersions have particular applicability in water based inks and overprint varnishes.

20 Claims, No Drawings

ADDITIVE DISPERSIONS CONTAINING ETHOXYLATED ALCOHOLS

REFERENCE TO RELATED APPLICATIONS

The present application is a continuation-in-part application of U.S. patent application Ser. No. 07/821,354 filed Jan. 15, 1992, now abandoned, which is a continuation-in-part application of U.S. patent application Ser. No. 07/690,748 filed Apr. 24, 1991, now abandoned, which is a continuation-in-part of U.S. patent application Ser. No. 07/616,475, filed Nov. 21, 1990, now U.S. Pat. No. 5,035,946 which is a divisional application of U.S. patent application Ser. No. 07/442,890, filed Nov. 28, 1989, now U.S. Pat. No. 5,008,144, which is a continuation-in-part application of U.S. patent application Ser. No. 267,064, filed Nov. 4, 1988, now U.S. Pat. No. 4,908,063.

FIELD OF THE INVENTION

1. Background of the Invention

This invention relates to aqueous dispersions containing ethoxylated alcohols and additives. Such dispersions have particular applicability in water-based inks and overprint varnishes. Water-based inks containing the dispersions of this invention exhibit improved gloss, adhesion, slip and the like. Overprint varnishes containing the dispersions of this invention exhibit improved gloss, toughness, heat resistance, lubricity and the like. Further, the dispersions of this invention have particular applicability as clear board. The vehicles for water-based inks are usually made from acrylic copolymers, acidic rosin esters, shellac, acidic styrene copolymers and various additives, such as waxes. The advantages of water-based inks include good press stability and printability, absence of fire hazard and volatile organic solvent emissions, convenience and the economy of water as a diluent and for wash-up. Since the water-based inks do not use volatile organic solvents, their use is gaining favor over the use of organic solvent-based inks.

Rotogravure inks normally comprise a pigment, a resin, a polymer or wax additive and a solvent. As in flexographic inks, water-based rotogravure inks are gaining favor over organic solvent-based inks because of environmental and worker hazard considerations.

In general, water-based inks are a mixture of water, resin, emulsifier or dispersing agent, a pigment and a polymer or wax additive. There exists a need to improve water-based inks in terms of gloss, maintenance, rub resistance, adhesion, slip, water resistance and other desirable properties.

In general, overprint varnishes are aqueous emulsions of polymers, such as acrylic and styrenic polymers which may also contain a hydrocarbon wax. Overprint varnishes are used to improve the properties of printed products which have been printed with relatively low-grade (and low cost) inks. Thus, for products for which very high quality printing is not necessary (e.g., cereal boxes, cracker boxes, tissue boxes, pet food bags, etc.), overprint varnishes offer an economical means of "upgrading" the appearance and other properties of products printed with low cost inks. Overprint varnishes are also used to improve the appearance and tactile qualities of higher grade protective coatings on such substrates as films or paper products, bearing on its surface printed matter.

There are four general classes of printing inks. There are letter press and lithographic inks, also known as oil inks or paste inks, and there are flexographic and rotogravure inks, also known as solvent or liquid inks. The dispersions of this invention have particular applicability for use in water-based flexographic and rotogravure inks. Although such inks have certain characteristics in common with inks used in other printing processes, they form a distinct class because of the character of the printing processes in which they are used, their applications and their formulations. The main distinction of flexographic and rotogravure inks is that they are normally of low viscosity compared to other classes of printing inks.

Flexographic and rotogravure inks have, in the past, been prepared by dispersing pigments or other colorants in volatile organic solvents such as alcohols, ketones and hydrocarbons. Due to environmental problems associated with the use of inks formulated with volatile organic solvents, water-based flexographic and rotogravure inks are becoming more important.

In flexographic printing, a form of rotary letter press uses a flexible plate, such as rubber, and fluid inks. Originally, flexographic printing was primarily used for paper bag printing but subsequently proved suitable for printing almost any kind of flexible packaging material. Flexographic inks generally consist of pigment dispersed in a vehicle made by dissolving one or more resins in a solvent, such as a volatile organic solvent or water. The water-based flexographic inks are widely used on paper and paper products, such as lithographic magazine covers. There exists a need to improve the overprint varnishes in terms of toughness, gloss, heat resistance, lubricity and other desirable properties.

Water based printing inks comprise a number of individual components. Resins, pigments, alcohols, water and waxes are a few of the more typical components that can be mentioned. The present invention is directed to the use of a class of waxes useful for forming an aqueous emulsion of a variety of inert hydrocarbons. Waxes can affect a number of important ink properties. Among such properties are slip, rub, adhesion and gloss.

2. Prior Art

U.S. Pat. No. 2,925,349 discloses a polish which utilizes alcohols having up to 20 carbon atoms as dispersants. Such alcohols may be oxyethylated.

U.S. Pat. No. 3,533,811 discloses a water-based printing ink comprising a water-miscible organic solvent, film forming resins which are soluble in the water-miscible solvent, pigment, soluble protein, a polymer latex and a volatile base. The water-miscible organic solvents which are used are lower aliphatic alcohols and the lower alkylene glycols and their esters and ethers.

U.S. Pat. No. 3,563,910 discloses oxyalkylated alcohols having up to 38 carbon atoms as emulsifiers for water/hydrocarbon mixtures.

U.S. Pat No. 3,884,707 discloses a water-based ink comprising a basic dye, water, an organic solvent and a resin. The organic solvents employed are, for example, ethylene glycol and its ethers.

U.S. Pat. No. 4,686,260 discloses a process for preparing a polymer emulsion for a water-based ink which contains colloidally suspended polymer. The emulsifiers used are anionic, cationic or nonionic emulsifiers or mixtures thereof such as a variety of alcohols and ethylene oxide derivatives of long-chained carboxylic acids such as lauric, myristic, palmitic, oleic and stearic acids. Also, analogous ethylene oxide condensates of long-chained alcohols, such as octyl, decyl, stearyl and cetyl alcohols are disclosed.

U.S. Pat. No. 4,499,225 discloses a coating composition composed of an aqueous mixture of polyethylene and a surfactant which may be a cationic, anionic or nonionic type. The composition can be used for coating for baking on various electrical and automobile parts. No nonionic surfactant was specifically identified from a chemical standpoint except by the use of the trade name of Surfynol No. 104. It is understood that Surfynol surfactants are proprietary mixtures containing 2,4,7,9-tetramethyl-5-decyl-4,7-diol surfactant.

U.S. Pat. No. 3,563,910 discloses an emulsifier composition consisting of a mixture of at least two straight and branched chain polyoxyalkylated alcohols useful in formulating insecticides, fungicides, defoliants and the like, as well as in the preparation of paraffinic waxes or coatings, such as paints.

Kubo et al U.S. Pat. No. 4,499,225 discloses aqueous emulsions of polypropylene and/or polyethylene using a nonionic surfactant. As compared with other nonionic surfactants, the alkoxylated long chain alcohols as disclosed in the present application uniquely form more stable dispersions of various hydrocarbons.

Fishman U.S. Pat. No. 3,563,910 describes an aqueous emulsion wherein the dispersant is a mixture of linear and branched oxyalkylated long chain alkyl alcohols. Such a mixture does not provide the emulsion stability required for use in fine water-based printing ink formulations as is provided by the essentially linear (virtually no branch formulations) oxyalkylated long chain alkyl alcohols of the present invention. Fishman teaches the need of a combination of linear and branched alcohols in certain ratios to form stable dispersions. Furthermore, Fishman teaches the importance of having coupling agents, such as toluene or other lipophilic material incorporated into the dispersions.

In the present invention, long chain ethoxylated linear alcohols are used to disperse a wide variety of hydrocarbon polymers in water in the absence of coupling agents or the need of pH adjustments normally found to be required in the prior art. For example, Felletschin U.S. Pat. No. 2,928,752 teaches formulating a water emulsion of paraffin and an ethoxylated oleyl ($C_{18}$) alcohol. Felletschin's emulsions require amine salts and fatty acids in combination with the ethoxylated oleyl alcohols to improve the stability of the paraffin in containing emulsions.

Essentially linear oxyalkylated shorter chain alkyl alcohols (i.e., up to $C_{20}$) have been used to form aqueous dispersions. Such dispersants have been found not to provide the stability required for use in fine water-based printing ink formulations as is provided by the essentially linear oxyalkylated long chain alkyl alcohols of the present invention.

SUMMARY OF THE INVENTION

In accordance with the present invention, it has been found that an aqueous dispersion of certain high molecular weight oxyalkylated primary alcohols and a mostly linear aliphatic hydrocarbon having a molecular weight of about 300–5,000 and/or partially oxidized or similarly modified mostly linear aliphatic hydrocarbon having a molecular weight of about 300–5,000 improves the print characteristics of water-based inks and coating characteristics of aqueous overprint varnishes. The water-based inks to which the additive compositions of the present invention are incorporated have improved adhesion, gloss, slip properties and other desirable characteristics. The aqueous overprint varnishes to which the additive compositions of the present invention are incorporated impart improved properties to all suitable substrates coated therewith. Among such substrates are paper products, plastic films and the like.

In accordance with another aspect of the present invention, an improved substrate, such as a film or paper product, bearing ink indicia (matter) printed thereon is provided by overlaying such substrate with a clear protective polymer coating having a formulation enhancing additive comprising a mixture of certain high molecular weight oxyalkylated primary alcohols and a mostly linear aliphatic hydrocarbon having a molecular weight of about 300–5,000 and/or partially oxidized or similarly modified mostly linear aliphatic hydrocarbon having a molecular weight of about 300–5,000. The coated product has improved rub resistance, slip, water spotting prevention, water spot blocking, adhesion over water-based inks, and clarity and other properties. Excellent stable dispersions can be prepared in the absence of coupling agents and without the need of pH adjustments.

Accordingly, an object of this invention is to provide a dispersion containing water, the described oxyalkylated alcohol, and the described aliphatic hydrocarbon and/or modified hydrocarbon. Such dispersions are suitable as an ink additive and can be used to significantly improve the performance of water-based inks.

Another object of the invention is to prepare a water-based ink of improved performance, containing an ink additive composition which includes water, the described oxyalkylated primary alcohol and the described hydrocarbon and/or modified hydrocarbon.

Another object of the invention is to provide a method of coating a substrate, such as a film or paper product, bearing printed ink indicia thereon or having no indicia thereon with a clear aqueous overprint varnish containing the additive composition of the present invention. The composition includes water, an oxyalkylated primary alcohol and a hydrocarbon and/or modified hydrocarbon.

Another object of the invention is to provide an improved substrate, such as a film or paper product, having printed ink indicia thereon or having no indicia thereon protected by a clear overprint varnish containing the additive composition comprising the previously described oxyalkylated primary alcohol and the previously described hydrocarbon and/or modified hydrocarbon. The varnish has been found to enhance the ink's adherence to film, paper and like substrates.

Another object of this invention is to provide a clear aqueous overprint varnish having a formulation enhancing additive incorporated therein, said additive comprising a hydrocarbon and certain high molecular weight oxyalkylated primary alcohols.

Yet another object of this invention is to provide an improved overprint varnish composed of a product consisting of an oxyalkylated primary linear alcohols and a linear aliphatic hydrocarbon as the sole ingredient thereof.

DESCRIPTION OF THE PREFERRED EMBODIMENT

It has been found that aqueous dispersions of a high molecular weight oxyalkylated alcohol having an average chain length in the hydrocarbon portion of the alcohol of from about 18 to about 226 carbon atoms, preferably from about 24 to about 90 carbon atoms, especially about 24–50 carbon atoms, and having from 1 to about 1,370 oxyalkylated units, and a mostly linear aliphatic hydrocarbon having a molecular weight of about 300–5,000 and/or partially oxidized or similarly modified mostly linear aliphatic hydrocarbon having a molecular weight of about 300–5,000 are useful in water-based inks and as an additive for use in compositions protecting printed paper products and/or nonabsorbent substrates and for use in clear aqueous overprint varnishes. Especially preferred as the modified mostly linear aliphatic hydrocarbon is a chemically modified linear aliphatic hydrocarbon such as a linear polyethylene graft with an acid anhydride such as maleic or fumaric anhydride.

The dispersants used in formulating the dispersants of this invention are represented by alkoxylated alcohols of the formula:

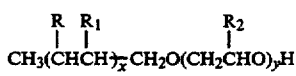

wherein R and $R_1$ individually represent hydrogen or the same or different lower alkyl groups of from 1 to about 10 carbon atoms; $R_2$ represents hydrogen or a $C_1$–$C_5$ alkyl group; x represents a number of from about 8 to about 112 and preferably from about 10 to about 24, and indicates the average number of carbon atoms in the hydrocarbon portion of the chain; and y represents the average number of oxyalkylene groups present in the molecule and is a number of from 1 to about 1,370, and preferably about 2 to about 65, most preferably from about 4 to about 50. The average molecular weight of the alkoxylated alcohols may range from about 350 to about 82,000, preferably no greater than 8,000. Particularly preferred is a dispersant of the above formula having a molecular weight between about 350 to about 3,000. The relative efficiency of the hydrophilic and lipophilic portions of the molecular can be controlled by the addition of varying amounts of ethylene oxide.

Especially preferred dispersants for use in formulating water-based ink additives and varnish compositions are those represented by the formula:

$$CH_3(CHRCHR_1)_xCH_2O(R_2)_y\text{—}H \qquad (IA)$$

wherein R and $R_1$ are independently selected from the group consisting of —H and $C_1$–$C_{10}$ alkyl group; $R_2$ is $CH_2CHR_3O$ wherein $R_3$ is —H or a $C_1$–$C_5$ alkyl group; wherein x and y are defined as set forth above.

Most preferred are those compounds represented by the formula:

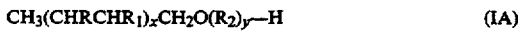

as well as mixtures thereof wherein x and y are defined as set forth above. As an alternative the dispersant may be of (IA) above where $R_2$ is randomly selected from units of the formulas $(CH_2CH_2O)$ and $(CH_2CHCH_3O)$. The average molecular weight of the oxyalkylated alcohols of Formula (IA) and Formulae (A) and (B) are most preferably about 375 to about 1700.

The dispersants are prepared by alkoxylation of alcohols represented by the formula:

wherein R, $R_1$ and x are defined above. A family of primary linear polymeric alcohols to be oxyalkylated are commercially available under the trade name UNILIN ® alcohols from Petrolite Polymers Division of Petrolite Corporation, Tulsa, Okla. Long chain linear polymeric alcohols, such as UNILIN ® alcohols, are, in turn, derived by hydroxylating long chain hydrocarbons. It is not uncommon for such linear polymeric alcohols to contain a certain quantity of non-hydroxylated long chain hydrocarbon precursors. For instance, the UNILIN ® alcohols contain approximately 80 to about 90 wt. percent alcohol and approximately 10 to about 20 wt. percent of saturated hydrocarbon.

The oxyalkylated alcohol for use in this invention therefore contains no more than 20 wt. percent of the non-hydroxylated hydrocarbon precursor. In such cases the oxyalkylated alcohol reaction product used in the dispersion of this invention, may contain the non-hydroxylated long chain hydrocarbon precursor. The amount of hydrocarbon precursor in such oxyalkylated reaction products is generally between 1.25 to about 2.5 percent by weight of the total weight of the dispersion.

Such alcohols are reacted with oxyalkylating agents such as ethylene oxide, propylene oxide and mixtures thereof. The starting materials can be readily alkoxylated with the just described alkylene oxides using typical base catalysts, such as potassium hydroxide, sodium hydroxide, sodium ethoxide, potassium t-butoxide, sodium hydride or sodium or potassium metals. The reaction is normally conducted under pressures of 0 to 60 psig and at temperatures of 212° to 356° F. (100° to 180° C.). Higher temperatures are normally avoided to minimize side reactions and color formation.

By varying the molecular weight of the starting alcohol and the amount of alkoxylation, a variety of compounds of varying molecular weights can be prepared. Thus, the molecular weight of the starting alcohol may be known to have an average molecular weight of from about 270 to about 2,000.

Also included in the aqueous dispersions of the present invention is a mostly linear or branched chain saturated aliphatic hydrocarbon having a molecular weight of between about 300 to about 5,000, preferably about 300 to about 2,200. This linear or branched chain aliphatic hydrocarbon is distinct from the fully saturated hydrocarbon backbone of the long chain alcohol used in this invention.

Such hydrocarbons include various polyethylenes. The polyethylene used in preparation of the dispersions of the present invention may be described as having a molecular weight of about 300–5,000. The polyethylene may be linear or may have a number of branch formations in its molecular structure. Such polyethylenes have a molecular weight distinct from that of the hydrocarbon precursor which are employed in the preparation of the long chain linear polymeric alcohols referenced above.

When branched hydrocarbons are combined with the ethoxylated polyalcohol, preferably they have one half to two branches per molecule on the average and the branches may have 1 to 6 carbons, preferably $C_1$–$C_6$ alkyl group. For brevity the polyethylenes and their respective molecular weights are identified by the term "PE" followed by a number indicating the molecular weight.

A particularly preferred embodiment of this invention is an aqueous dispersion comprising a dispersant of formula IA above having a molecular weight between about 350 to 1700. The hydrocarbon additive has a molecular weight between about 700 to about 5000, preferably from about 800 to about 5,000 most preferably 800 to about 2000.

In addition to the polyethylenes, the aliphatic saturated hydrocarbon component of the dispersion of the present invention may comprise petroleum-derived waxes, such as paraffin and microcrystalline waxes. The paraffin waxes are mostly linear alkanes having about 20-36 carbon atoms per molecule on the average and a molecular weight of about 280-500 and may include $C_{18}$-$C_{36}$ isoalkanes and cycloalkanes. The microcrystalline waxes have molecular weights of about 500-700 or 800 with somewhat more branching than the paraffin waxes.

Furthermore, the aliphatic saturated hydrocarbon component of the dispersion of the present invention includes Fischer-Tropsch waxes. Such waxes are polymethylenes. Polymethylene wax production is based on the Fischer-Tropsch synthesis, which is basically the polymerization of carbon monoxide under high pressure to produce the wax. The polymethylene waxes useful herein preferably may have an average molecular weight of 600-1,000.

Also contemplated in the present invention are the above described hydrocarbons which may have been chemically modified without sacrificing the ink enhancing properties of the dispersion of the present invention. These include the partially oxidized polyethylenes, polymethylenes and the petroleum-derived waxes. The oxidized low molecular weight mostly linear hydrocarbons of a molecular weight of 300-3,000 have multiple functional groups, such as carboxylic acid, ketones, alcohols, esters, etc., distributed along their chains or are the result of a graft polymerization process. Particularly preferred are linear polyethylenes upon which has been grafted cyclic anhydrides such as maleic, fumaric and itaconic acid anhydride.

The functional groups of the oxidized hydrocarbons may be generally quantified by determination of an acid number which is the amount of potassium hydroxide in milligrams required to neutralize one gram of the oxidized polymer. The oxidized hydrocarbons will normally have an acid number in the range of from about 5 to about 200.

Also, the polyethylenes, besides being homopolymers, may be copolymers of ethylene with propylene, butylene, etc. and oxygen-containing units such as vinyl acetate, acrylic acid, etc., as long as the ink and/or overprint varnish enhancing properties are retained. Other closely related materials that can be used include the natural waxes, such as beeswax, carnauba and candelila waxes.

One method of preparing of the aqueous dispersion of the present invention is by the following procedure:
1. The final solids content of the dispersion which is desired is determined. The maximum solids content attainable will vary with the molecular weight and the amount of alkoxylation of the described dispersants.
2. The amount of water needed is weighed into an agitated dispersion vessel and the amount of dispersant needed is added to a separate container.
3. The dispersant and hydrocarbon are heated to 15°-20° F. (8°-11° C.) above its melting point which may range from about 165°-300° F. (74°-149° C.); and, at the same time, the water is heated to about 190° F. (88° C.).
4. When both components are heated to the appropriate temperatures, the dispersant and hydrocarbon mixture is slowly poured into the heated water which is at the same time vigorously stirred.
5. When all of the dispersant and hydrocarbon mixture has been added to the water, the heat source is removed and stirring is continued for 2 to 3 additional minutes.
6. The dispersion is slowly stirred, cooling at the rate of about 2°-4° F. (1°-2° C.) per minute. When the temperature reaches about 140° F. (60° C.), the cooling rate may be increased or held constant until the desired pour temperature is reached. A stable dispersion results.

Alternatively, instead of heating both dispersant and hydrocarbon component in step 3 above, all of the hydrocarbon or a portion of the hydrocarbon may be incorporated into the dispersion after the dispersion is prepared.

The addition of a small amount of the dispersion of the present invention in inks and overprint varnish notably improves the performance of such inks in regard to gloss, immediate adhesion, delayed adhesion, coefficient of friction (COF), wet rub, dry rub and water resistance. Gloss can be determined using conventional glossmeters, adhesion can be determined by adhesive tape pull tests, slip can be determined using conventional slide angle/slip and friction testers, rub resistance can be determined using a Sutherland Rub Tester and water resistance can be determined by a water drop test at 10, 30 and 60 second application intervals. These are standard tests employed by the industry.

The preferred composition of the present invention is an aqueous dispersion having a solids content of at least 8.0% by weight. The solids content of the dispersion may be lower but normally is much higher in the range of at least 20% by weight and as high as 70% by weight. Dispersions useful for adding to water-based inks or aqueous overprint varnishes in accordance with the present invention may contain about 30-92% by weight water, about 2-40% by weight alkoxylated alcohol and about 1-60% by weight of hydrocarbon and/or modified hydrocarbon. The amount of hydrocarbon to modified hydrocarbon may range from 0 to 100% hydrocarbon. Preferably, the dispersion will comprise about 40 to about 80, most preferably about 50 to about 75, percent by weight water; about 2 to about 30, most preferably about 5 to about 25, percent by weight oxyalkylated alcohol; and about 1 to about 60, most preferably about 2 to about 50, percent by weight of hydrocarbon and/or modified hydrocarbon.

It has been found that excellent results are obtained when a mixture of oxidized and unoxidized polyethylenes as the hydrocarbon mixture are used. The most preferred composition is 50-85% water, 2-15% alkoxylated alcohol and 10-35% of oxidized plus unoxidized polyethylene. It is preferred for the oxidized polyethylene portion of the mixture to be about 50-95% and the unoxidized polyethylene portion of the mixture to be about 5-50%. Excellent results have been obtained where the composition contains 70-80% oxidized polyethylene and 20-30% unoxidized polyethylene.

Water-based inks and aqueous overprint varnish compositions containing about 0.5 to about 10% by weight of the dispersion of the present invention have improved properties. The preferred amount of the dispersion in the inks is about 1-8% by weight.

The additive formulation of the present invention may be incorporated in conventional clear aqueous overprint varnishes containing a polymer and water. Typically, the polymer may be a styrenic/acrylic copolymer. Any polymer suitable for use in clear aqueous overprint varnishes are useful.

In the following examples, all percentages are on a weight/weight basis unless otherwise indicated.

The following examples will illustrate the practice of the present invention in its preferred embodiments. Other embodiments within the scope of the claims herein will be apparent to one skilled in the art from consideration of the specification and practice of the invention as disclosed herein. It is intended that the specification, together with the examples, be considered exemplary only, with the scope and spirit of the invention being indicated by the claims which follow.

EXAMPLE I

This example illustrates preparation of the oxyalkylated alcohol component which serves as the dispersant of the composition of the present invention.

A primary linear alcohol of the following formula was prepared by oxidation of a corresponding polyethylene precursor:

$$CH_3(CH_2CH_2)_xCH_2OH$$

wherein x is about 23.

This olefin-derived linear polymeric alcohol was oxyethylated in a conventional manner to provide an oxyethylated alcohol having 16 ethylene oxide units per mole of polymer on the average and a molecular weight of about 1,400 and melting about 224° F. (107° C.).

EXAMPLE II

This example illustrates the preparation of an aqueous dispersion of the oxyethylated alcohol prepared in Example I.

Using the formulating procedure as described above, a suitable quantity of water was heated to 190° F. (88° C.). In a separate vessel, the oxyethylated alcohol was heated to a molten condition. Then, molten oxyethylated alcohol was added to the hot water under high shear conditions to yield a 25% by weight aqueous dispersion of the oxyethylated alcohol and cooled. This dispersion was designated Composition 1.

EXAMPLE IV

This example illustrates the preparation of an aqueous dispersion containing the oxyethylated alcohol and a mixture of oxidized and unoxidized micronized low molecular weight linear polyethylenes.

To 100 parts by weight of the aqueous dispersion prepared in accordance with Example II, 1.9 parts by weight of the oxidized polyethylene (MW=1,500) and 0.6 parts by weight of the unoxidized polyethylene (MW=2,000) were added and vigorously blended into the dispersion. The resulting composition was given the designation of Composition 2.

EXAMPLE V

In this example, an aqueous dispersion was prepared by mixing at a temperature of 280° F. (138° C.) under pressure water, the oxyalkylated alcohol of Example I and unoxidized linear polyethylene wax having a molecular weight of 2,000 to produce a dispersion composed of 60% by weight water, 19% by weight oxyalkylated alcohol and 21% by weight polyethylene. Upon cooling the polyethylene precipitated as particles having an average size of 2 microns. The resulting dispersion was designated Composition 3.

EXAMPLE VI

This example illustrates the preparation of a water-based ink.

The following ink composition was prepared:

TABLE 1

| Ingredient | Weight % | Supplier |
|---|---|---|
| Joncryl 61-LV | 13.0 | S. C. Johnson |
| Water | 2.5 | — |
| Isopropanol (95%) | 4.5 | — |
| Foamburst 320CT | 1.0 | Ross Chemical |
| Neocryl A-1054 | 55.0 | ICI Resins |
| Flexiverse BCD5103 | 24.0 | Sun Chemical |

This preparation was accomplished by weighing Joncryl 61-LV acrylic dispersion and water into a mixing tub. Then, Foamburst 320CT antifoam, isopropanol and Neocryl A-1054 acrylic resin dispersion were added to the tub and mixed thoroughly with the other ingredients therein. Finally, the Flexiverse BCD5103 blue pigment was added to the tub and mixed thoroughly with the ingredients therein to form a well dispersed ink composition. This ink composition was blended with ink additive compositions as described in Example VII.

EXAMPLE VII

Water-based blue surface inks containing compositions of the present invention were applied to various substrates and were tested for gloss, 90° degree delayed adhesion, static coefficient of friction (slide angle) and dynamic coefficient of friction (slide angle) using a four color, flexographic press. Composition 4 was an aqueous P.E. dispersion.

Higher gloss readings and higher adhesions are desirable properties and lower coefficients of friction are also desirable properties in the following table.

TABLE 2

| Gloss on Low Density Polyethylene Substrate | | |
|---|---|---|
| Ink Additive | Ink Additive % | Glossmeter Reading |
| Composition 2 | 3 | 77 |
| Composition 2 | 6 | 76 |
| Composition 3 | 1.25 | 80 |
| Composition 3 | 3.75 | 74 |
| Composition 4 | 5 | 80 |

TABLE 3

| Gloss on Polypropylene Film | | |
|---|---|---|
| Ink Additive | Ink Additive % | Glossmeter Reading |
| Composition 2 | 3 | 87 |
| Composition 2 | 6 | 79 |
| Composition 3 | 1.25 | 86 |
| Composition 3 | 3.75 | 68 |
| Composition 4 | 5 | 80 |

TABLE 4

90° Delayed Adhesion on Low Density Polyethylene Substrate

| Ink Additive | Ink Additive % | Rating |
|---|---|---|
| Composition 2 | 3 | 10.0 |
| Composition 2 | 6 | 10.0 |
| Composition 3 | 1.25 | 9.0 |
| Composition 3 | 3.75 | 7.5 |
| Composition 4 | 5 | 8.0 |

TABLE 5

90° Delayed Adhesion on Polypropylene Film

| Ink Additive | Ink Additive % | Rating |
|---|---|---|
| Composition 2 | 3 | 1.0 |
| Composition 2 | 6 | 10.0 |
| Composition 3 | 1.25 | 4.5 |
| Composition 3 | 3.75 | 8.0 |
| Composition 4 | 5 | 6.5 |

TABLE 6

Static COF* on Low Density Polyethylene Substrate

| Ink Additive | Ink Additive % | COF |
|---|---|---|
| Composition 2 | 3 | 0.43 |
| Composition 2 | 6 | 0.49 |
| Composition 3 | 1.25 | 0.48 |
| Composition 3 | 3.75 | 0.47 |
| Composition 4 | 5 | 0.47 |

*Coefficient of Friction as measured using slide angle test employing Testing Machines, Inc., Model No. 32-25-00.

TABLE 7

Static COF on Polypropylene Film

| Ink Additive | Ink Additive % | COF |
|---|---|---|
| Composition 2 | 3 | 0.58 |
| Composition 2 | 6 | 0.57 |
| Composition 3 | 1.25 | 0.59 |
| Composition 3 | 3.75 | 0.50 |
| Composition 4 | 5 | 0.47 |

TABLE 8

Dynamic COF on Low Density Polyethylene Substrates

| Ink Additive | Ink Additive % | COF |
|---|---|---|
| Composition 2 | 3 | 0.31 |
| Composition 2 | 6 | 0.34 |
| Composition 3 | 1.25 | 0.32 |
| Composition 3 | 3.75 | 0.37 |
| Composition 4 | 5 | 0.34 |

TABLE 9

Static COF on Polypropylene Film

| Ink Additive | Ink Additive % | COF |
|---|---|---|
| Composition 2 | 3 | 0.38 |
| Composition 2 | 6 | 0.33 |
| Composition 3 | 1.25 | 0.38 |
| Composition 3 | 3.75 | 0.26 |
| Composition 4 | 5 | 0.31 |

In this example, the speed of the printer was held constant at 200 feet/minute and each run was about a minute long. The temperature on the drier was held at 170° F. (77° C.) for all the runs. This example shows that the water-based printing aid compositions of the present invention are useful in the formulation of water-based inks.

EXAMPLE VIII

A second oxyethylated alcohol having a molecular weight of about 865 and an ethylene oxide content of 10 moles per mole of polymer was prepared.

EXAMPLE IX

In this example, an aqueous dispersion containing paraffin wax was prepared to form a 50% solids composition. Of the solids 10% by weight was composed of the oxyalkylated alcohol of Example VIII and 90% by weight of paraffin wax (MP=147° F. (63.9° C.)). The dispersion was added to printing ink at an additive level of 3.0% by weight. The resulting ink when applied to various surfaces showed improved characteristics.

When used in small amounts by weight of the ink composition in water-based inks, the aqueous dispersions prepared in accordance with this example improve such inks in terms of gloss maintenance and rub resistance without sacrifice of adhesion of the inks to a substrate, of slip of the inks from the substrate and of water spot resistance of inks applied to a variety of substrates.

EXAMPLE X

This example illustrates the improvements in the polyethylene in water using the long chain oxyalkylated alcohol dispersants as compared to the use of other tested nonionic surfactants.

In various tests the use of long chain oxyalkylated alcohol dispersants as used in the present invention was compared with the use of other nonionic dispersants with regard to the ability of each to form stable dispersions of polyethylene having a molecular weight of 500 (PE-500).

The dispersants tested as follows:

TABLE 10

| Surfactant | Description |
|---|---|
| a | The oxyalkylated alcohol prepared generally in accordance with Example I of the instant application but having an average molecular weight of 900 and 10 ethylene oxide units |
| b | T Maz 81, Mazer, Inc., HLB 10.0 (POE-5-sorbitan monooleate) |
| c | T Maz 61, Mazer, Inc., HLB 9.6 (POE-5-sorbitan monostearate) |
| d | Tween 81, ICI Americas, Inc., HLB 10.0 (POE-5-sorbitan oleate) |
| e | Tween 61, ICI Americas, Inc., HLB 9.6 (POE-4-sorbitan monostearate) |
| f | Brig 30, ICI Americas, Inc., HLB (POE-4-lauryl ether) |
| g | Hodag 20-LT, Hodag Inc., HLB 10.0 (PEG-200-monolaurate) |
| h | Hodag 40-LT, Hodag Inc., HLB 12.8 (PEG-400 monolaurate) |
| i | Triton N-57, Rohm-Haas, HLB 10.0 (nonylphenol +5EO) |
| j | Surfynol 104-E, Air Products Co., (2,4,7,9-tetramethyl-5-decyl-4,7-diol) |

Dispersions of PE-500 were made by melting various amounts of PE-500 and various amounts of the tested surfactants by heating and stirring the PE-500 and surfactants together to about 225° F. Then, each of the resulting melts was poured into various amounts of water at 200° F. with vigorous stirring. While still being stirred, each of the resulting aqueous dispersions was quickly cooled to room temperature. Then, the stability of each dispersion was visually noted. The results of these tests have been set forth in the following table wherein the weights of the components are given in grams:

TABLE 11

| Surfactant | Wt. of Surfactant | Wt. of H$_2$O | Wt. of PE-500 | Observation |
|---|---|---|---|---|
| a | 5 | 450 | 45 | White stable dispersion of extremely fine particles |
| b | 5 | 450 | 45 | White dispersion with quick separation of particles |
| c | 5 | 450 | 45 | White dispersion with quick separation of particles |
| d | 5 | 450 | 45 | White dispersion with quick separation of particles |
| e | 5 | 450 | 45 | White dispersion with quick separation of particles |
| f | 5 | 450 | 45 | White dispersion with some large particles and with quick separation of particles |
| g | 5 | 450 | 45 | White dispersion with quick separation of particles |
| h | 5 | 450 | 45 | White dispersion with many large particles and with quick separation of particles |
| i | 5 | 450 | 45 | White dispersion with many large particles and with quick separation of particles |
| j | 5 | 450 | 45 | White dispersion with quick separation of particles |
| b | 10 | 450 | 40 | White dispersion with quick separation of particles |
| b | 15 | 450 | 35 | White dispersion with many large particles and with quick separation of particles |
| b | 20 | 450 | 30 | White dispersion of small particles and with quick separation of particles |
| e | 15 | 450 | 35 | White dispersion with many large particles and with quick separation of particles |

From the above data, it can be seen that the stability of aqueous dispersions of polyethylene of low molecular weight is greater when the dispersants used in the ink composition of the present invention is used as compared to the use of other tested nonionic surfactants.

EXAMPLE XI

Various compositions of the present invention were tested as property enhancing additives in clear aqueous overprint varnishes conventionally used to protect paper products having ink indicia printed thereon. In the tests, 8×5½ inch paper cards obtained from the Lenneta Company were employed. One half of each card was blank and the other half had black lithographic ink printed on it. The cards had a very light coating of lacquer on both the blank portion and the black portion.

To a standard overprint varnish, additives of the present invention were incorporated in a series of tests and a standard additive presently in use in the industry was incorporated in a comparative test. The enhancement of the tested varnishes in terms of gloss, rub resistance and slip angle slide was determined using conventional and known procedures.

In each of the tests the standard overprint protecting varnish had the following composition as set forth in Table 12:

TABLE 12

| Ingredient | Parts/hundred (pph) |
|---|---|
| Styrene/acrylic copolymer | 90 |
| Surfynol 104-E emulsifier | 0.3 |

TABLE 12-continued

| Ingredient | Parts/hundred (pph) |
|---|---|
| Water | 9.7 |

The effectiveness of the additive compositions of the present invention in enhancing the properties of the just described clear aqueous overprint varnish as compared to the effectiveness of a standard additive conventionally used in the trade to assist formulators of aqueous overprint varnishes as above described was determined. In all the tests the black portion of the cards was used as surface on which the properties were determined.

The standard additive known as Jonwax 26 and obtained from S. C. Johnson Co. is identified as a 25% solid aqueous dispersion of polyethylene wax containing 6% fatty acid soap as the dispersant.

Additive Composition 6 was composed of 21% polyethylene of 2,000 molecular weight (PE-2000), 19% of the oxyethylated alcohol dispersant of Formula B above where x averages 24 and n averages 16, and 60% water.

Additive Composition 7 was composed of 45% of a paraffin wax (Citco Pacemaker 53), 5% of the oxyethylated alcohol dispersant of Formula B above where x averages 14 and n averages 10, and 50% water.

Additive Composition 8 was composed of 50% of Composition 6 and 50% of Composition 7.

The test data of the various tests have been tabulated in Table 13:

TABLE 13

| Additive | % | Rub Resistance Relative Rating (0 → 4 best) | Slide Angle Static Slip Resistance | Slide Angle Dynamic Slip Resistance | Gloss |
|---|---|---|---|---|---|
| Blank | 0.0 | 0.0 | 34 | 32 | 68 |
| Standard | 6.0 | 1.0 | 23 | 16 | 70 |
| No. 6 | 3.8 | 4.0 | 23 | 14 | 65 |
| No. 7 | 3.0 | 3.6 | 14 | 9 | 72 |
| No. 8 | 3.3 | 4.0 | 16 | 9 | 68 |

As can be seen from the above table, the additives of the present invention consistently provide better relative rub resistance even at lower amounts as compared to the use of the standard additive. Improvements are also noted in both static slip resistance and dynamic slip resistance with the use of the additives of the present invention without sacrifice of gloss.

EXAMPLE XII

In this example, the performances in terms of forming a stable aqueous dispersion of formulations of the present invention using an oxyethylated essentially linear C$_{24}$ alkyl alcohol dispersant were compared with a. formulations using a 1:1 mixture of an oxyethylated linear alkyl (C$_{20}$) alcohol dispersant and an oxyethylated branched alkyl (C$_{30}$) alcohol and b. formulations using an oxyethylated linear C$_{20}$ alkyl alcohol dispersant.

A first formulation was prepared using the dispersant described in Example I where x is 11.

A second formulation was prepared using a known dispersant sold by Ethyl Corporation under the name Epal 20 which is an oxyethylated alkyl alcohol. The number of ethylene oxide units were about 5–8. The number of carbon atoms in alkyl alcohol moiety was about 20. On the average about 50% of the alkyls were linear and the remainder was branched. This dispersant is similar to that used in the Fishman patent discussed above.

A third formulation was prepared using a known dispersant sold by Conoco under the name Alfol which is an oxyethylated alkyl alcohol with 5–8 ethoxy units. The number of carbon atoms in the alcohol moiety was about 20, this being a lesser number than that required in the formulations of the present invention.

In terms of percent alcohol moiety and oxyethylated moiety, the tested dispersant of the present invention was about 85–90% and 10–15%, respectively. Epal 20 comprised about 66% alcohol moiety and 34% oxyethylated moiety. Alfol comprised about 79% alcohol moiety and 21% oxyethylated moiety.

Each of the formulations was prepared as follows:

One part of the ethoxylated alcohol and ten parts of polyethylene having a molecular weight of 500 were heated to 215° F. and added slowly with agitation to 100 parts of water maintained at 200° F. After the addition was completed, the resulting mixture was quickly cooled (in about two minutes) to room temperature.

The three formulations were allowed to stand for 24 hours. During this period, the stability of each formulation was measured using the ASTM Method D3707, Storage Stability of Water in Oil Dispersions by the Oven Test Method.

In one additional test, paraffin was used as the inert hydrocarbon and the dispersant was that described Example I. The results of this testing have been tabulated in Table 14 below:

TABLE 14

| Ethoxylated Alcohol | Inert Hydrocarbon | EO Content Moles | 2 Hour Stability | 24 hour Stability |
|---|---|---|---|---|
| Epal 20 | PE-500 | 5 | Separation | Separation |
| Epal 20 | PE-500 | 8 | Separation | Separation |
| Alfol 20 | PE-500 | 5 | Separation | Separation |
| Alfol 20 | PE-500 | 8 | Separation | Separation |
| Compound C24** | PE-500 | 9 | Stable | Stable |
| Compound C24 | Paraffin | 9 | Stable | Stable |

**Compound C24 is $CH_3(CH_2CH_2)_xCH_2(OCH_2CH_2)_yOH$ where x is 11 and y is 8 to 9.

As can be seen from the above data, the compositions of the present invention remained stable after 24 hours whereas the compositions using the prior art dispersants manifested separation of the inert hydrocarbon at two hours. Thus, the stability of the composition of the present invention is superior to the stability of the prior art compositions.

EXAMPLE XIII

In the above referenced Fishman patent, with the use of a combination of linear and branched oxyalkylated alcohols in given ratios, it is suggested that various coupling agents, such as toluene, be incorporated in the dispersion to enhance the stability. It has been found that the stability of the compositions of the present invention is retained without the use of such coupling agent.

EXAMPLE XIV

Behenyl alcohol was ethoxylated to provide an ethoxylated (8 EO units) behenyl alcohol. This alcohol was chosen as it is a $C_{22}$ branched/linear alcohol and is closely related in terms of the lower limit of the number of carbon atoms in the alcohol moiety of the dispersant of the present invention. Using the ethoxylated behenyl alcohol did not provide the stability as the dispersant in the present invention. A composition of 100 parts water, 10 parts PE-500 and 1 part ethoxylated behenyl alcohol was prepared and compared with a composition of 100 parts water, 10 parts PE-500 and 1 part of the ethoxylated alkyl alcohol of Example I. These two compositions were evaluated for long term stability using the ASTM method described in Example XII. The results of such testing has been tabulated in Table 15 below:

TABLE 15

| Ethoxylated Alcohol | Inert Hydrocarbon | EO Content Moles | 2 Hour Stability | 72 hour Stability |
|---|---|---|---|---|
| Behenyl | PE-500 | 8 | Stable | Separation |
| Behenyl | Paraffin | 8 | Stable | Separation |
| Compound C24 | PE-500 | 9 | Stable | Stable |
| Compound C24 | Paraffin | 9 | Stable | Stable |

EXAMPLE XV

In the Kubo et al reference above, it is taught that pH adjusting agents are needed to provide more stable dispersions. The dispersions of the present invention were adjusted using either hydrochloric acid or ammonium hydroxide.

The results of testing the stability of the various compositions over a wide range of pH's have been tabulated in Table 16 below:

TABLE 16

| Ethoxylated Alcohol | Inert Hydrocarbon | EO Content Moles | Inert pH | Adjusted pH | 2 Hour Stability | 72 hour Stability |
|---|---|---|---|---|---|---|
| Compound C24 | PE-500 | 9 | 7.5 | 1.0 | Stable | Stable |
| Compound C24 | Paraffin | 9 | 7.5 | 11.0 | Stable | Stable |

From this table, it can be noted that the dispersions of the present invention are stable over a wide pH range.

EXAMPLE XVI

The six compositions described in Table 16 above were used to coat #5 Lenneta cards. The applied material was drawn down over the card using a #4 Myer drawdown wire. The appearance of the cards was observed. The observations are described in Table 17 below:

TABLE 17

| Ethoxylated Alcohol | Inert Hydrocarbon | Drawdown Pattern Description |
|---|---|---|
| Epal 20 | PE-500 | Large soft particles |
| Epal 20 | PE-500 | Numerous fine particles |
| Alfol 20 | PE-500 | Numerous fine particles |
| Alfol 20 | PE-500 | Numerous fine particles |
| Compound C24 | PE-500 | Uniform dispersion |
| Compound C24 | Paraffin | Uniform dispersion |

From the above, it can be seen that the aqueous dispersions of inert hydrocarbons having the linear oxyethylated dispersant with the number of carbon atoms in the alcohol moiety being at least 24 provide superior ink compositions compared to the use of heretofore known oxyethylated dispersants which have either a branch chain alcohol moiety or a lower linear alkyl alcohol moiety.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention as herein disclosed, including all features which would be regarded as equivalents thereof by those skilled in the art to which the present invention pertains.

What is claimed is:

1. An aqueous dispersion comprising:
   (a) water;
   (b) a dispersant prepared by oxyalkylating a long chain alcohol containing a fully saturated hydrocarbon backbone, wherein said dispersant is represented by the formula:

   $CH_3(CHRCHR_1)_xCH_2O(R_2)_y$—H wherein R and $R_1$ are independently selected from the group consisting of hydrogen and $C_1$–$C_{10}$ alkyl; $R_2$ is $CH_2CHR_3O$ wherein $R_3$ is —H or a $C_1$–$C_5$ alkyl group; and x is about 8 to about 112 and y is about 1 to about 1,370; and
   (c) a linear or branched chain saturated aliphatic hydrocarbon having a molecular weight of from about 300 to about 5,000 wherein said hydrocarbon is distinct from the fully saturated hydrocarbon backbone of said long chain alcohol.

2. The dispersion of claim 1 wherein $R_2$ is selected from the group consisting of:
   (a) $CH_2CH_2O$;
   (b) $CH_2CHCH_3O$; and
   (c) randomly distributed units of $CH_2CH_2O$ and $CH_2CHCH_3O$.

3. The dispersion of claim 2 wherein x is between about 10 to about 24 and y is between about 4 to about 50.

4. An aqueous dispersion comprising:
   (a) between about 30 to about 92% by weight of water;
   (b) between about 2 to about 40% by weight of a dispersant prepared by oxyalkylating a long chain alcohol containing a fully saturated hydrocarbon backbone, wherein said dispersant is represented by the formula:

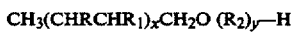
   $CH_3(CHRCHR_1)_xCH_2O\ (R_2)_y$—H wherein R and $R_1$ are independently selected from the group consisting of hydrogen and $C_1$–$C_{10}$ alkyl; $R_2$ is $CH_2CHR_3O$ wherein $R_3$ is —H or a $C_1$–$C_5$ alkyl group; and x is about 8 to about 112 and y is about 1 to about 1,370; and
   (c) between about 1 to about 60 weight percent of a linear or branched chain saturated aliphatic hydrocarbon having a molecular weight of from about 300 to about 5,000 wherein said hydrocarbon is distinct from the fully saturated hydrocarbon backbone of said long chain alcohol.

5. The dispersion of claim 4 wherein x is between about 10 to about 24 and y is between about 4 to about 50.

6. The dispersion of claim 2 wherein the molecular weight of the linear or branched chain hydrocarbon is between about 300 to about 2200.

7. The dispersion of claim 4 wherein R and $R_1$ are independently selected from hydrogen and methyl.

8. An aqueous dispersion comprising:
   (a) water;
   (b) a dispersant having a molecular weight between about 375 to about 1700 and which is represented by the formula:

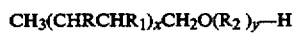
   $CH_3(CHRCHR_1)_xCH_2O(R_2)_y$—H wherein R and $R_1$ are independently selected from the group consisting of hydrogen and $C_1$–$C_{10}$ alkyl; $R_2$ is $CH_2CHR_3O$ wherein $R_3$ is —H or a $C_1$–$C_5$ alkyl group; and x is about 10 to about 24 and y is about 2 to about 65; and
   (c) a linear or branched chain saturated aliphatic hydrocarbon having a molecular weight of from about 800 to about 5,000.

9. The dispersion of claim 8 wherein R and $R_1$ are independently selected from hydrogen and methyl.

10. The dispersion of claim 8 wherein the molecular weight of the aliphatic hydrocarbon is less than or equal to 2,000.

11. The dispersion of claim 8 wherein the aliphatic hydrocarbon is polyethylene.

12. An aqueous dispersion of water and a linear alcohol of the formula:

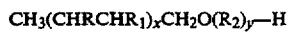
   $CH_3(CHRCHR_1)_xCH_2O(R_2)_y$—H wherein
   R and $R_1$ are independently selected from the group consisting of hydrogen and $C_1$–$C_{10}$ alkyl; $R_2$ is $CH_2CHR_3O$ wherein $R_3$ is —H or a $C_1$–$C_5$ alkyl group; and x is about 8 to about 112 and y is about 1 to about 1,370 which when incorporated into a formulation containing a linear or branched chain saturated aliphatic hydrocarbon renders a protective coating, wherein
   said saturated aliphatic hydrocarbon has a molecular weight of from about 300 to about 5,000; and
   said hydrocarbon is distinct from the fully saturated hydrocarbon backbone of said linear alcohol.

13. The dispersion of claim 12 wherein x is between about 10 to about 24 and y is between about 2 to about 65.

14. The dispersion of claim 13 wherein the molecular weight of the alcohol is about 375 to about 1700.

15. The dispersion of claim 13 wherein R and $R_1$ are independently selected from hydrogen and methyl.

16. An ethoxylated linear alcohol of the formula

   $CH_3(CHRCHR_1)_xCH_2O(R_2)_y$—H wherein
   R and $R_1$ are independently selected from the group consisting of hydrogen and $C_1$–$C_{10}$ alkyl; $R_2$ is $CH_2CHR_3O)$ wherein $R_3$ is —H or a $C_1$–$C_5$ alkyl group; and x is about 8 to about 112 and y is about 1 to about 1,370 which when added to a linear or branched chain hydrocarbon and water renders an aqueous dispersion of said hydrocarbon and said alcohol, wherein the linear or branched chain hydrocarbon is a saturated aliphatic hydrocarbon having a molecular weight of from about 300 to about 5,000; and said hydrocarbon is distinct from the fully saturated hydrocarbon backbone of said linear alcohol.

17. The alcohol of claim 16 wherein $R_2$ is selected from the group consisting of:
 (a) $CH_2CH_2O$;
 (b) $CH_2CHCH_3O$; and
 (c) randomly distributed units of $CH_2CH_2O$ and $CH_2CHCH_3O$.

18. The alcohol of claim 17 wherein x is between about 10 to about 24 and y is between 2 to about 65.

19. An aqueous dispersion comprising:
 (a) water;
 (b) a dispersant represented by the formula:

$$CH_3(CHRCHR_1)_xCH_2O(R_2)_y-H$$

wherein R and $R_1$ are independently selected from the group consisting of hydrogen and $C_1$–$C_{10}$ alkyl; $R_2$ is $CH_2CHR_3O$ wherein $R_3$ is —H or a $C_1$–$C_5$ alkyl group; and x is about 8 to about 112 and y is about 1 to about 1,370; and
 (c) a linear or branched chain saturated aliphatic hydrocarbon having a molecular weight from 300 to about 5000 onto which has been grafted aliphatic anhydride.

20. The dispersion of claim 19 wherein an acid anhydride is selected from the group consisting of maleic, fumaric and itaconic acid anhydride.

* * * * *

UNITED STATES PATENT AND TRADEMARK OFFICE
CERTIFICATE OF CORRECTION

PATENT NO. : 5,376,170

DATED : December 27, 1994

INVENTOR(S) : Timothy J. Baker

It is certified that error appears in the above-identified patent and that said Letters Patent is hereby corrected as shown below:

Column 1, line 31, after "clear", insert --protective coatings on such substrates as films or paper products, bearing on its surface printed matter.

There are four general classes of printing inks. There are letter press and lithographic inks, also known as oil inks or paste inks, and there are flexographic and rotogravure inks, also known as solvent or 7liquid inks. The dispersions of this invention have particular applicability for use in water-based flexographic and rotogravure inks. Although such inks have certain characteristics in common with inks used in other printing processes, they form a distinct class because of the character of the printing processes in which they are used, their applications and their formulations. The main distinction of flexographic and rotogravure inks is that they are normally of low viscosity compared to other classes of printing inks.

Flexographic and rotogravure inks have, in the past, been prepared by dispersing pigments or other colorants in volatile organic solvents such as alcohols, ketones and

UNITED STATES PATENT AND TRADEMARK OFFICE
CERTIFICATE OF CORRECTION

PATENT NO. : 5,376,170

DATED : December 27, 1994

INVENTOR(S) : Timothy J. Baker

It is certified that error appears in the above-identified patent and that said Letters Patent is hereby corrected as shown below:

hydrocarbons. Due to environmental problems associated with the use of inks formulated with volatile organic solvents, water-based flexographic and rotogravure inks are becoming more important.

In flexographic printing, a form of rotary letter press uses a flexible plate, such as rubber, and fluid inks. Originally, flexographic printing was primarily used for paper bag printing but subsequently proved suitable for printing almost any kind of flexible packaging material. Flexographic inks generally consist of pigment dispersed in a vehicle made by dissolving one or more resins in a solvent, such as a volatile organic solvent or water. The water-based flexographic inks are widely used on paper and paper--;

Column 1, line 64, delete "protective coatings on such substrates as films or paper products, bearing on its surface printed matter.

There are four general classes of printing inks. There are letter press and lithographic inks, also known as oil inks or

UNITED STATES PATENT AND TRADEMARK OFFICE
CERTIFICATE OF CORRECTION

PATENT NO. : 5,376,170

DATED : December 27, 1994

INVENTOR(S) : Timothy J. Baker

It is certified that error appears in the above-identified patent and that said Letters Patent is hereby corrected as shown below:

paste inks, and there are flexographic and rotogravure inks, also known as solvent or liquid inks. The dispersions of this invention have particular applicability for use in water-based flexographic and rotogravure inks. Although such inks have certain characteristics in common with inks used in other printing processes, they form a distinct class because of the character of the printing processes in which they are used, their applications and their formulations. The main distinction of flexographic and rotogravure inks is that they are normally of low viscosity compared to other classes of printing inks.

Flexographic and rotogravure inks have, in the past, been prepared by dispersing pigments or other colorants in volatile organic solvents such as alcohols, ketones and hydrocarbons. Due to environmental problems associated with the use of inks formulated with volatile organic solvents, water-based flexographic and rotogravure inks are becoming more important.

UNITED STATES PATENT AND TRADEMARK OFFICE
CERTIFICATE OF CORRECTION

PATENT NO. : 5,376,170               Page 4 of 5
DATED : December 27, 1994
INVENTOR(S) : Timothy J. Baker It is certified that error appears in the above-identified patent and that said Letters Patent is hereby corrected as shown below:

In flexographic printing, a form of rotary letter press uses a flexible plate, such as rubber, and fluid inks. Originally, flexographic printing was primarily used for paper bag printing but subsequently proved suitable for printing almost any kind of flexible packaging material. Flexographic inks generally consist of pigment dispersed in a vehicle made by dissolving one or more resins in a solvent, such as a volatile organic solvent or water. The water-based flexographic inks are widely used on paper and paper";

Column 5, line 56, before formula (B), insert $$-- CH_3(CH_2CH_2)_xCH_2O(CH_2CH_2O)_yH \qquad (A)$$

and --

Column 15, line 30, before "Example", insert --in--;

Column 17, line 26, change "$CH_2CHR_5O$" to --$CH_2CHR_3O$--;

Column 17, line 57, change "$C_{1-C5}$" to --$C_1$-$C_5$--;

Column 18, line 38, change "$CH_2CHR_3O$" to --$CH_2CHR_3O$--;

UNITED STATES PATENT AND TRADEMARK OFFICE
CERTIFICATE OF CORRECTION

PATENT NO. : 5,376,170

DATED : December 27, 1994

INVENTOR(S) : Timothy J. Baker

It is certified that error appears in the above-identified patent and that said Letters Patent is hereby corrected as shown below:

Column 18, line 63, change "$CH_2CHR_3O$)" to --$CH_2CHR_3O$--;

Column 18, line 63, change "$C_{1-C5}$" to --$C_1$-$C_5$--;

Signed and Sealed this

Fourteenth Day of March, 1995

Attest:

BRUCE LEHMAN

Attesting Officer

Commissioner of Patents and Trademarks